United States Patent
Godelar et al.

(10) Patent No.: US 11,949,296 B2
(45) Date of Patent: Apr. 2, 2024

(54) SENSOR ARRANGEMENT COMPRISING TWO ROTATION ANGLE SENSORS OF DIFFERENT TYPES

(71) Applicant: Hella GmbH & Co. KGaA, Lippstadt (DE)

(72) Inventors: Karine Godelar, Pins Justaret (FR); Herve Gasc, Fonsorbes (FR); Charles-Henry Feuillet, Toulouse (FR); Arnaud Rafel, Tournefeuille (FR); Michel Moutarde, Fonsorbes (FR)

(73) Assignee: Hella GmbH & Co. KGaA, Lippstadt (DE)

( * ) Notice: Subject to any disclaimer, the term of this patent is extended or adjusted under 35 U.S.C. 154(b) by 393 days.

(21) Appl. No.: 17/337,096

(22) Filed: Jun. 2, 2021

(65) Prior Publication Data

US 2021/0336514 A1   Oct. 28, 2021

Related U.S. Application Data

(63) Continuation of application No. PCT/EP2018/084791, filed on Dec. 13, 2018.

(51) Int. Cl.
*H02K 11/21* (2016.01)
*G01D 5/14* (2006.01)
*H02K 11/215* (2016.01)

(52) U.S. Cl.
CPC .......... *H02K 11/215* (2016.01); *G01D 5/145* (2013.01); *H02K 2211/03* (2013.01)

(58) Field of Classification Search
CPC .. H02K 11/215; H02K 2211/03; G01D 5/202; G01D 5/145; G01D 3/08; G01B 7/004
See application file for complete search history.

(56) References Cited

U.S. PATENT DOCUMENTS

| 6,091,171 A | * | 7/2000 | Ohishi | H02K 5/225 |
| | | | | 310/68 B |
| 10,530,222 B2 | * | 1/2020 | Kloer | H02K 15/14 |

FOREIGN PATENT DOCUMENTS

| DE | 19520299 A1 | 12/1996 |
| DE | 202007010280 U1 | 10/2007 |
| EP | 2180296 A1 | 4/2010 |

* cited by examiner

*Primary Examiner* — Leda T Pham
(74) *Attorney, Agent, or Firm* — Husch Blackwell LLP

(57) ABSTRACT

A sensor assembly is provided comprising two rotational angle sensors of different type. The sensor assembly has a rotor and a stator. The first rotational angle sensor has an antenna comprised by the stator and a modulator comprised by the rotor. The second rotational angle sensor having a magnet comprised by the rotor and a magnetoresistive element or a hall sensor comprised by the stator.

11 Claims, 3 Drawing Sheets

SENSOR ARRANGEMENT COMPRISING TWO ROTATION ANGLE SENSORS OF DIFFERENT TYPES

CROSS REFERENCE

This application claims priority to PCT Application No. PCT/EP2018/084791, filed Dec. 13, 2018, the entirety of which is hereby incorporated by reference.

FIELD OF THE INVENTION

The invention concerns a sensor assembly comprising two rotational angle sensors of different type, the sensor assembly having a rotor and a stator, the first rotational angle sensor having a antenna comprised by the stator and a modulator comprised by the rotor, and the second rotational angle sensor having a magnet and a magnetoresistive element or a hall sensor comprised by the stator.

BACKGROUND OF THE INVENTION

Such a sensor arrangement is known from the document with the publication number EP 2 180 296 A1. The rotor of this sensor arrangement is coupled to a second rotor via a toothed gear. This second rotor carries the magnet of the second rotation angle sensor. The magnetoresistive element of the second rotation angle sensor is arranged on the stator, which is a common stator for the first rotational angle sensor and the second rotational angle sensor. Instead of the magnetoresistive element a hall sensor may be used.

Through the coupling of the two rotors via the gear mechanism, a rotary motion of the first rotor is transmitted to the second rotor. The gear is designed so that the second rotor has a higher rotational speed than the first rotor. When the first rotor is rotated by a first angle, the second rotor therefore rotates by a different angle. This leads to a high complexity of the evaluation of the sensor signals. In addition, the transmission of motion by means of the gear mechanism can be error-prone. For example, dirt could block the gears, preventing motion transmission and, in the worst case, even damage or destruction of the gears.

A further disadvantage of the known sensor arrangement is that a comparably large installation space is required for accommodating the two rotors.

The invention is based on the task of creating a new sensor arrangement of the type mentioned at the beginning, in which an error-prone transmission of motion is dispensable and the two rotary angle sensors can be accommodated in a compact manner.

BRIEF SUMMARY OF THE INVENTION

According to the invention, this task is solved by the rotor enclosing the magnet. Instead of two rotors, only one rotor is provided at the invention. This eliminates the transmission of motion through a gear mechanism, with all the disadvantages described above.

The rotor of a sensor arrangement according to the invention may have a shaft at one end of which the magnet is arranged. The magnet is preferably attached to one end of the shaft.

The modulator can also be attached to the shaft. The modulator may be provided on a printed circuit board having a circular surface on which one or more conductive tracks are provided to form the modulator. A hole in the printed circuit board can have an inside diameter that corresponds to the outside diameter of the shaft. The modulator can also be a metal part, for example made by punching from a sheet metal. The modulator can also be a part which will modulate the signal coming from the antenna.

The stator may comprise at least one electrical component, in particular an integrated circuit, for supplying power to elements of the first and/or second angle-of-rotation sensor. At least one electrical component, in particular an integrated circuit, may also be provided for evaluating a signal from the antenna and the magnetoresistive element or hall sensor. The components may include filter elements.

The stator may have a printed circuit board on which the antenna, the magnetoresistive element or hall sensor and at least one electrical component are provided. The antenna can be formed by one or more conductive tracks.

The magnetoresistive element or hall sensor can be located in a projection in the direction of the axis of rotation within a circular disk concentric to the axis of rotation. The modulator can be located in a projection in the direction of the rotation axis within a circular ring concentric to the rotation axis. The circular disc can be located within the circular ring and have an outer diameter smaller than the inner diameter of the circular ring. A zone may be provided between the circular disc and the circular ring to prevent mutual disturbances between the first rotational angle sensor and the second rotational angle sensor, in particular interferences. This zone creates a distance between the circular disc and the circular ring which is on the one hand so large that disturbances are reliably avoided and on the other hand so small that the size of the sensor arrangement can be so small. In this zone there are preferably no magnetically and/or electrically conductive materials present which could cause an electromagnetic interference of one rotation angle sensor by the other rotation angle sensor. In the zone, however, materials and/or structures can be provided which cause an electromagnetic decoupling of the two rotation angle sensors.

The at least one electrical component for powering the second rotational angle sensor and/or for evaluating a signal from the magnetoresistive element or hall sensor is preferably located within the circular disc. This allows cables between the magnetoresistive element or hall sensor and the component to be evaluated to be kept short. Interferences that could be coupled in via lines can thus be minimized.

The at least one electrical component for powering the first rotation angle sensor and/or the second rotation angle sensor and/or for evaluating a signal from the antenna and/or the magnetoresistive element or hall sensor may be located outside the circular ring.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
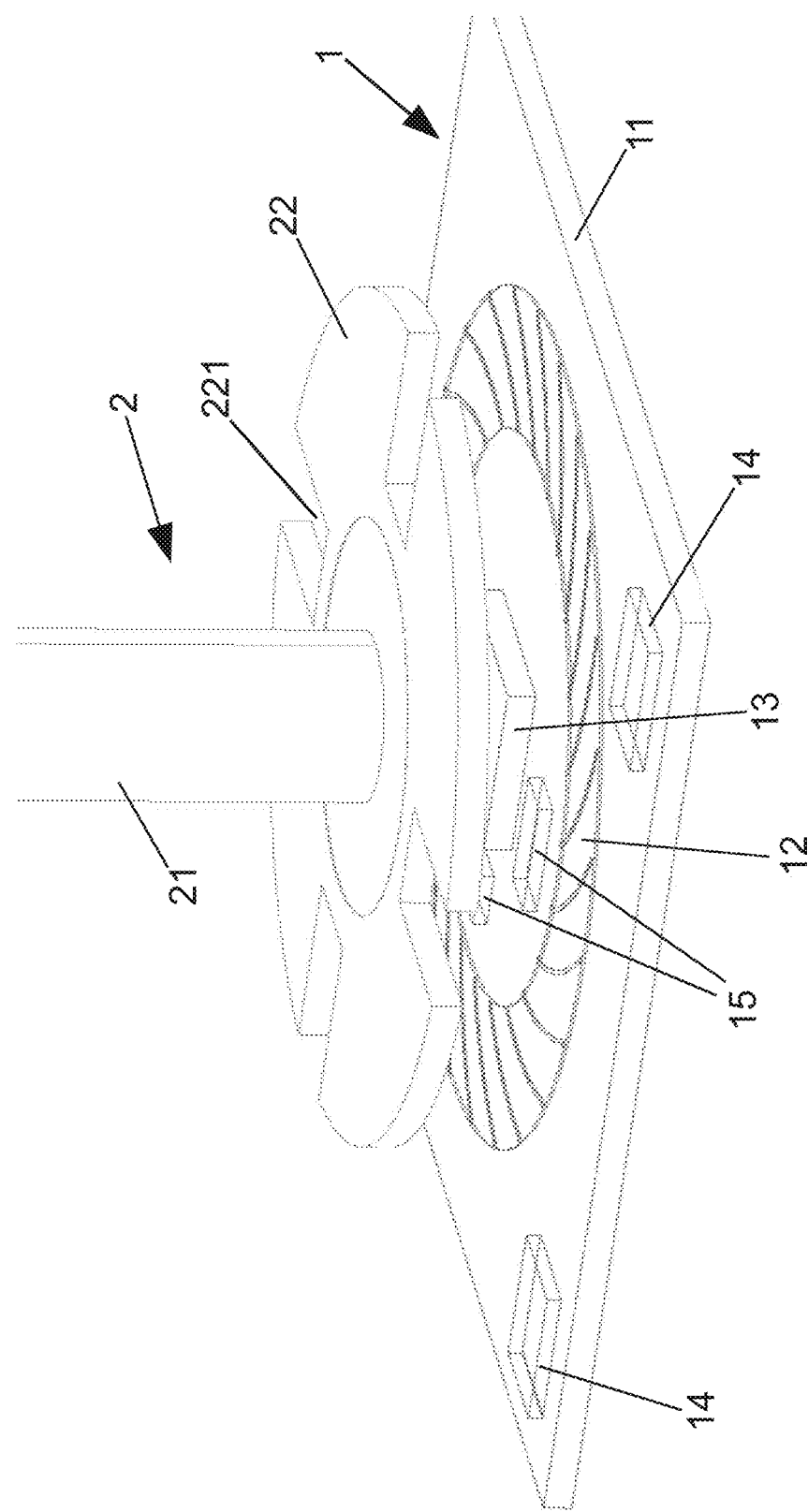
FIG. 1 is a perspective side view of a sensor arrangement according to the invention.
Figure 2:
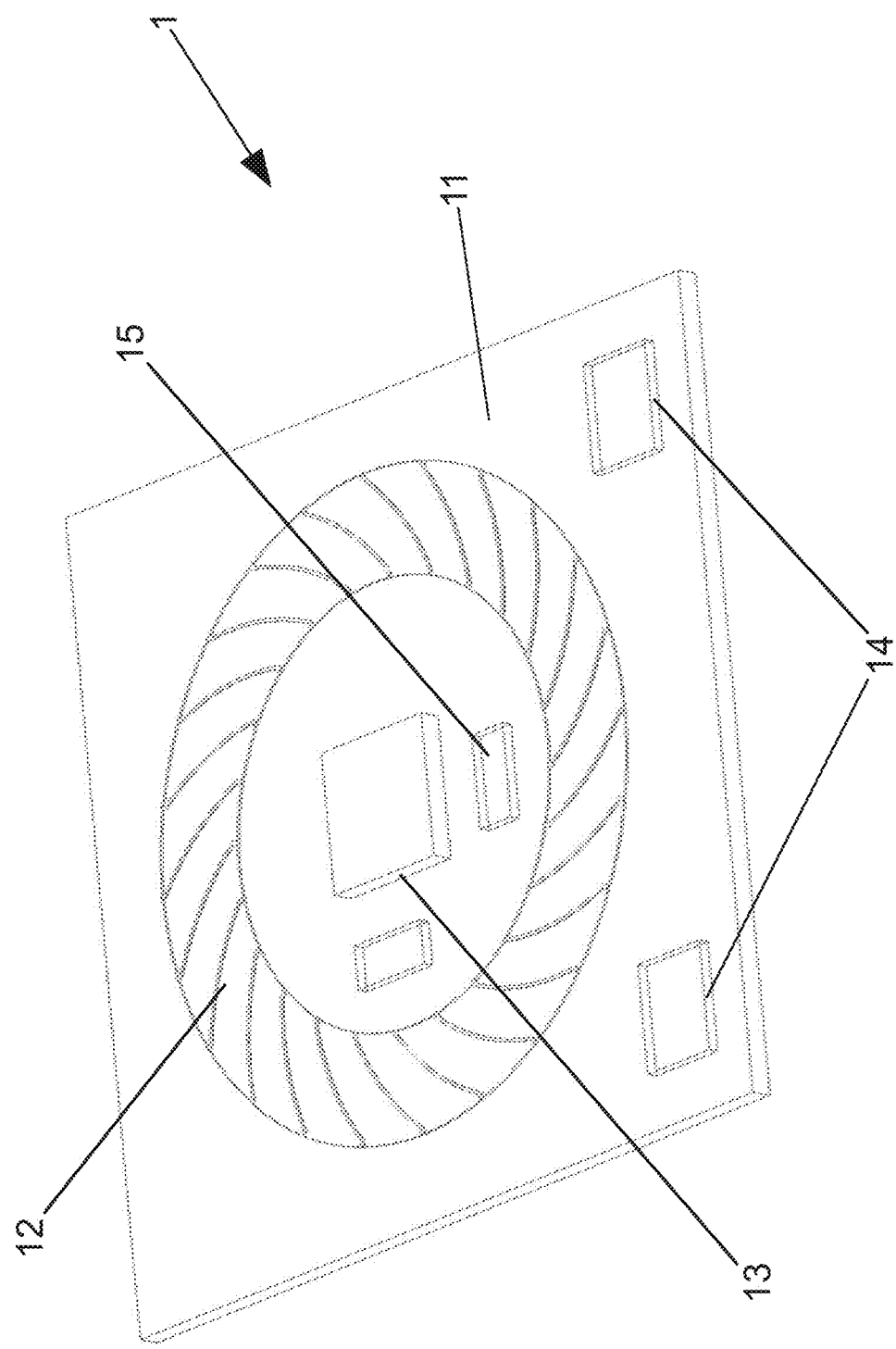
FIG. 2 is a bird's eye view of a stator of the invention sensor arrangement.
Figure 4:
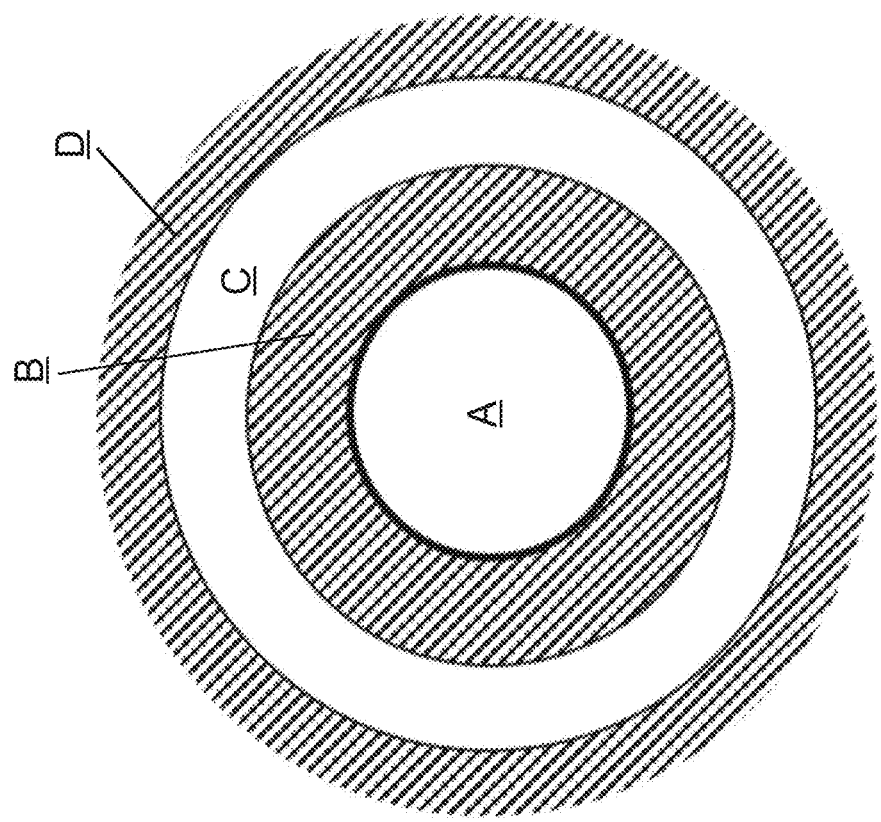
FIG. 4 is a representation of zones of the stator.
Figure 3:
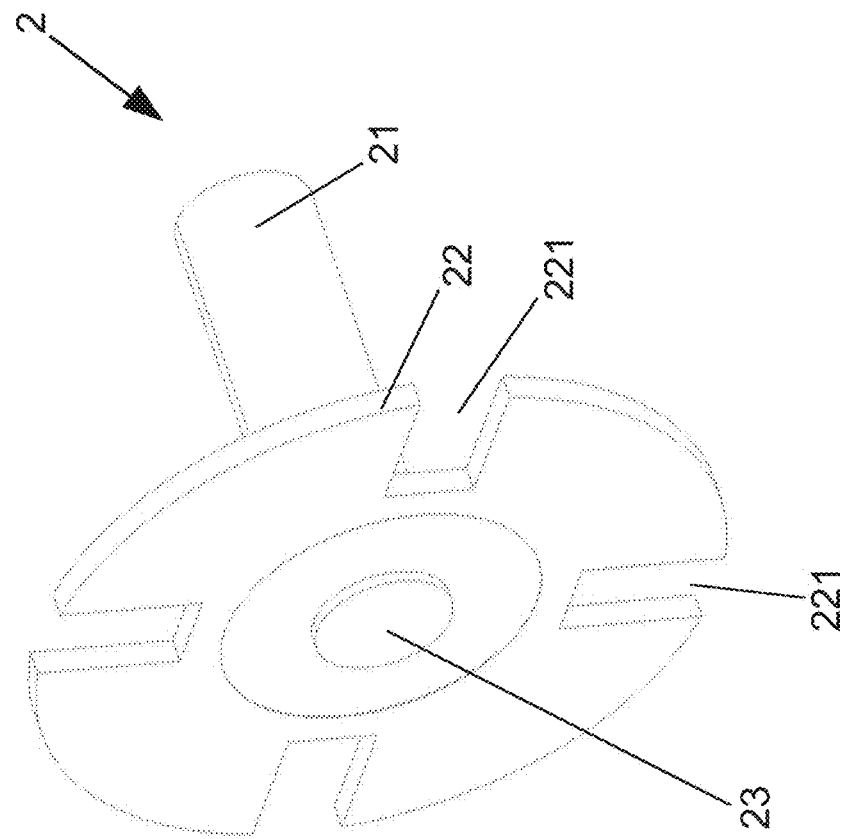
FIG. 3 is a perspective view of a rotor sensor arrangement according to the invention.

The stator 1 of the invention sensor arrangement shown has a printed circuit board 11, on which a antenna 12 is arranged, which is formed by conductor tracks. This antenna 12 has a circular contour, which is provided in a zone C of stator 1.

In a center of zone C, stator 1 has a circular disk-shaped zone A in which a magnetoresistive element 13 is provided. The magnetoresistive element is connected to integrated components 15, which can supply the magnetoresistive element with energy and evaluate a signal of the magnetoresistive element. The components are connected to each other via lines that are not shown.

A zone B in the form of a circular ring is provided between zone A in the centre and zone C. This zone has the shape of a circular ring. This zone B is for interference suppression, which will be explained below.

Zone C is enclosed by a zone D that may extend to the edge of printed circuit board 11. In zone D further components are provided, namely components 14, which can be used to generate a signal which is transmitted to the antenna. In addition, components 14 make it possible to receive a signal from the antenna and evaluate this signal.

Rotor 2 of the sensor arrangement according to the invention has a shaft 21. This shaft is mounted turnable, what is not shown. The bearing is designed so that the shaft 21 and all parts of the rotor 2 attached to the shaft are rotatable about a longitudinal axis of the shaft 21.

The parts of rotor 2 attached to shaft 21 may include a printed circuit board 22 carrying a modulator formed by a structure of conductive tracks or a metallic part which will modulate the signal coming from the PCB antenna. The printed circuit board 22 has recesses 221 in areas where there are no tracks, which can be reduced by the mass of the printed circuit board.

The parts of rotor 2 attached to shaft 21 also include a magnet 23 attached to one end of shaft 21. The magnet 23 has the shape of a flat cylinder, which can have a hole in its center for fixing it on the shaft, which is arranged coaxially to the longitudinal axis.

Rotor 2 is arranged so that it can rotate relative to stator 1 so that zones A, B and C are coaxial with the axis of rotation of rotor 2.

The antenna 12 and the modulator 22 form a first rotation angle sensor of the sensor arrangement and the magnetoresistive element 13 and the magnet 23 form a second rotation angle sensor of the sensor arrangement. The areas in which the sensors are arranged are spatially separated from each other.

The signal generated by one of the components 14 and coupled into the antenna 12 generates an electromagnetic field which is changed by the rotation of the modulator. This change affects the antenna and changes the signal according to the angle of rotation of the rotor to the stator. The signal can be received by one of the components 14 for evaluation by the antenna.

The second rotation angle sensor can be based on the anisotropic magnetoresistive effect, the giant magnetoresistance effect, the tunnel magnetoresistance effect or any other magnetoresistive effect or the hall effect. By the relative movement of the magnet 23 and the magnetoresistive element 13, the magnetoresistive element 13 generates a signal corresponding to the angle of rotation that can be evaluated with one of the components 15. Thus, both the first rotation angle sensor and the second rotation angle sensor provide the rotation angle of rotor 2 to stator 1, which can be further evaluated.

Zone B is used to prevent interference between the first rotation angle sensor and the second rotation angle sensor. It is as large as necessary so that disturbances can be safely avoided, but at the same time so small that the rotor and stator take up as little space as possible.

Zone D surrounding zone C is defined so that no other component is interfering with the first rotation angle sensor.

Because the integration aspect of sensor arrangement is very important, these zones B and D must be sized as small as possible so that the redundant sensor arrangement is taking as less space as possible.

REFERENCE CHARACTER LIST 1 stator
11 printed circuit boards
12 antenna
13 magnetoresistive element
14 components for generating a transmission signal and evaluating a signal of the antenna
15 components for the evaluation of a signal of the magnetoresistive sensor.
2 rotor
21 shank
22 modulator
221 recesses
23 magnet
A zone of the printed circuit board of the stator for the magnetoresistive sensor and components
B zone for decoupling of the first and second angle sensors
C zone of the printed circuit board of the stator for the antenna
D zone depicted by any surface cohesive to stator 1 being outside of zone C

The invention claimed is:

1. A sensor arrangement comprising:
a first rotational angle sensor and a second rotational angle sensor, the first and second rotational angle sensors being of different types;
a rotor;
a stator (1),
wherein the first rotational angle sensor having an antenna comprised by the stator, and having a modulator comprised by the rotor, and
wherein the second rotational angle sensor having a magnet and at least one of a magnetoresistive element and a hall sensor comprised by the stator,
wherein the rotor comprises the modulator and the magnet.

2. The sensor arrangement according to claim 1, wherein the rotor has a shaft at one end of which the magnet is arranged.

3. The sensor arrangement according to claim 1, wherein between the antenna and the modulator of the first rotational sensor, and the magnetoresistive element or hall sensor and the magnet of the second rotational sensor, there is a zone (B) to prevent mutual disturbances between the first rotational angle sensor and the second rotational angle sensor.

4. The sensor arrangement according to claim 1, wherein the modulator and the shaft are interdependant.

5. The sensor arrangement according to claim 1, wherein the stator has at least one electrical component for supplying power to elements of the first and/or second rotation angle sensor and/or for evaluating a signal from the antenna and the magnetoresistive element or hall sensor.

6. The sensor arrangement according to claim 5, wherein the stator has a printed circuit board on which the antenna, the magnetoresistive element or hall sensor and the at least one electrical component are arranged.

7. The sensor arrangement according to claim 1, wherein the magnetoresistive element or hall sensor lies in a projection in a direction of an axis of rotation within a circular disc concentric with the axis of rotation.

8. The sensor arrangement according to claim 1, wherein the modulator lies in a projection in a direction of an axis of rotation within a circular ring concentric with the axis of rotation.

9. The sensor arrangement according to claim 7, wherein the circular disc lies within the circular ring and has an outer diameter which is smaller or equal than the inner diameter of the circular ring.

10. The sensor arrangement according to claim 7, wherein at least one electrical component for supplying power to a second angle-of-rotation sensor and/or for evaluating a signal from the magnetoresistive element or hall sensor lies within the circular disc.

11. The sensor arrangement according to claim 7, wherein at least one electrical component for supplying power to the first rotation angle sensor and/or second rotation angle sensor and/or for evaluating a signal from the antenna and/or the magnetoresistive element or hall sensor lies outside the annular ring.

\* \* \* \* \*